US010868856B2

(12) United States Patent
Morper

(10) Patent No.: US 10,868,856 B2
(45) Date of Patent: Dec. 15, 2020

(54) NETWORK ELEMENT AND METHOD OF RUNNING APPLICATIONS IN A CLOUD COMPUTING SYSTEM

(71) Applicant: NOKIA SOLUTIONS AND NETWORKS OY, Espoo (FI)

(72) Inventor: Hans-Jochen Morper, Erdweg (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/905,494

(22) PCT Filed: Jul. 19, 2013

(86) PCT No.: PCT/EP2013/065260
§ 371 (c)(1),
(2) Date: Jan. 15, 2016

(87) PCT Pub. No.: WO2015/007331
PCT Pub. Date: Jan. 22, 2015

(65) Prior Publication Data
US 2016/0156702 A1    Jun. 2, 2016

(51) Int. Cl.
*H04L 29/08* (2006.01)
*H04L 12/24* (2006.01)
*H04L 29/12* (2006.01)

(52) U.S. Cl.
CPC .............. *H04L 67/10* (2013.01); *H04L 41/20* (2013.01); *H04L 61/2015* (2013.01)

(58) Field of Classification Search
None
See application file for complete search history.

(56) References Cited

U.S. PATENT DOCUMENTS

| | | | | |
|---|---|---|---|---|
| 2002/0010734 A1* | 1/2002 | Ebersole | ............... | H04L 29/06 709/201 |
| 2012/0268384 A1* | 10/2012 | Peterson | ............... | H01H 13/85 345/170 |
| 2013/0054761 A1 | 2/2013 | Kempf et al. | | |

(Continued)

FOREIGN PATENT DOCUMENTS

| CN | 102710432 A | 10/2012 |
|---|---|---|
| WO | WO 2013/097900 A1 | 7/2013 |

OTHER PUBLICATIONS

Xie et al. "Use Cases for ALTO with Software Defined Networks draft-xie-alto-sdn-use-cases-00.txt" Jun. 19, 2012 (Year: 2012).*

(Continued)

*Primary Examiner* — Younes Naji
(74) *Attorney, Agent, or Firm* — Squire Patton Boggs (US) LLP

(57) ABSTRACT

A network element for a cloud computing system is provided, wherein the cloud computing system is adapted for running applications, in particular different kinds of applications, wherein the network element comprises a receiving unit adapted to receive a resource request for running of an application, a determination unit adapted to determine whether the application is a non-SDN-aware application, and a mediator unit adapted to provide SDN context to the network element in case it is determined that the application is a non-SDN-aware application.

9 Claims, 8 Drawing Sheets

(56) References Cited

U.S. PATENT DOCUMENTS

| | | | | |
|---|---|---|---|---|
| 2013/0250770 A1* | 9/2013 | Zou | ............... | H04L 47/19 |
| | | | | 370/238 |
| 2014/0226985 A1* | 8/2014 | Patel | ............... | H04L 45/12 |
| | | | | 398/79 |
| 2014/0325649 A1* | 10/2014 | Zhang | ............... | H04L 43/024 |
| | | | | 726/23 |
| 2014/0368665 A1* | 12/2014 | Lirette | ............... | H04N 21/442 |
| | | | | 348/180 |
| 2016/0036730 A1* | 2/2016 | Kutscher | ............... | H04L 45/38 |
| | | | | 370/401 |

OTHER PUBLICATIONS

International Search Report & Written Opinion dated Jun. 3, 2014 corresponding to International Patent Application No. PCT/EP2013/065260.

Margaret Chiosi et al., "Network Functions Virtualisation—An Introduction, Benefits, Enablers, Challenges & Call for Action," Contributing Organisations & Authors, Oct. 22, 2012, XP055091626, retrieved from the Internet: URL: http://www.tid.es/es/Documents/NFV_White_PaperV2.pdf., pp. 1-16.

H. Xie et al., "Use Cases for ALTO with Software Defined Networks draft-xie-alto-sdn-extension-use-cases-01," Use Cases for Alto with Software Defined Networks; Draft-XIE-ALTO-SDN-EXTENSION-USE-CASES-01.TXT, Internet Engineering Task Force, Jan. 9, 2013, pp. 1-29, XP015089409.

Chinese Office Action application No. 201380079671.5 dated Apr. 3, 2018.

Third Office Action dated Jul. 23, 2019 corresponding to Chinese Patent Application No. 201380079671.5.

Chinese Office Action issued in corresponding Chinese Patent Application No. 201380079671.5 dated Dec. 29, 2018.

T. Pan et al., "Software-Defined Network (SDN) Problem Statement and Use Cases for Data Center Applications", 14 pages, Mar. 11, 2012, URL: https://tools.ietf.org/pdf/draft-pan-sdn-dc-problem-statement-and-use-cases-02.pdf.

Rob Sherwood, et al., "Flow Visor: A Network Virtualization Layer", Stanford University, Palo Alto, CA USA, 15 pages, Oct. 14, 2009, available at http://OpenFlowSwitch.org/downloads/technicalreports/openflow-tr-2009-1-flowvisor.pdf.

P. Pan, et al., "Software-Defined Network (SND) Problem Statement and Use Cases for Data Center Applications", draft-pan-sdn-dc-problem-statement-and-use-cases-02.txt, Network Working Group, Internet-Draft, Intended status: Standards Track, Expires: Sep. 12, 2012, Mar. 11, 2012, 14 pages, available at https://tools.ietf.org/html/draft-pan-sdn-dc-problem-statement-and-use-cases-02.

* cited by examiner

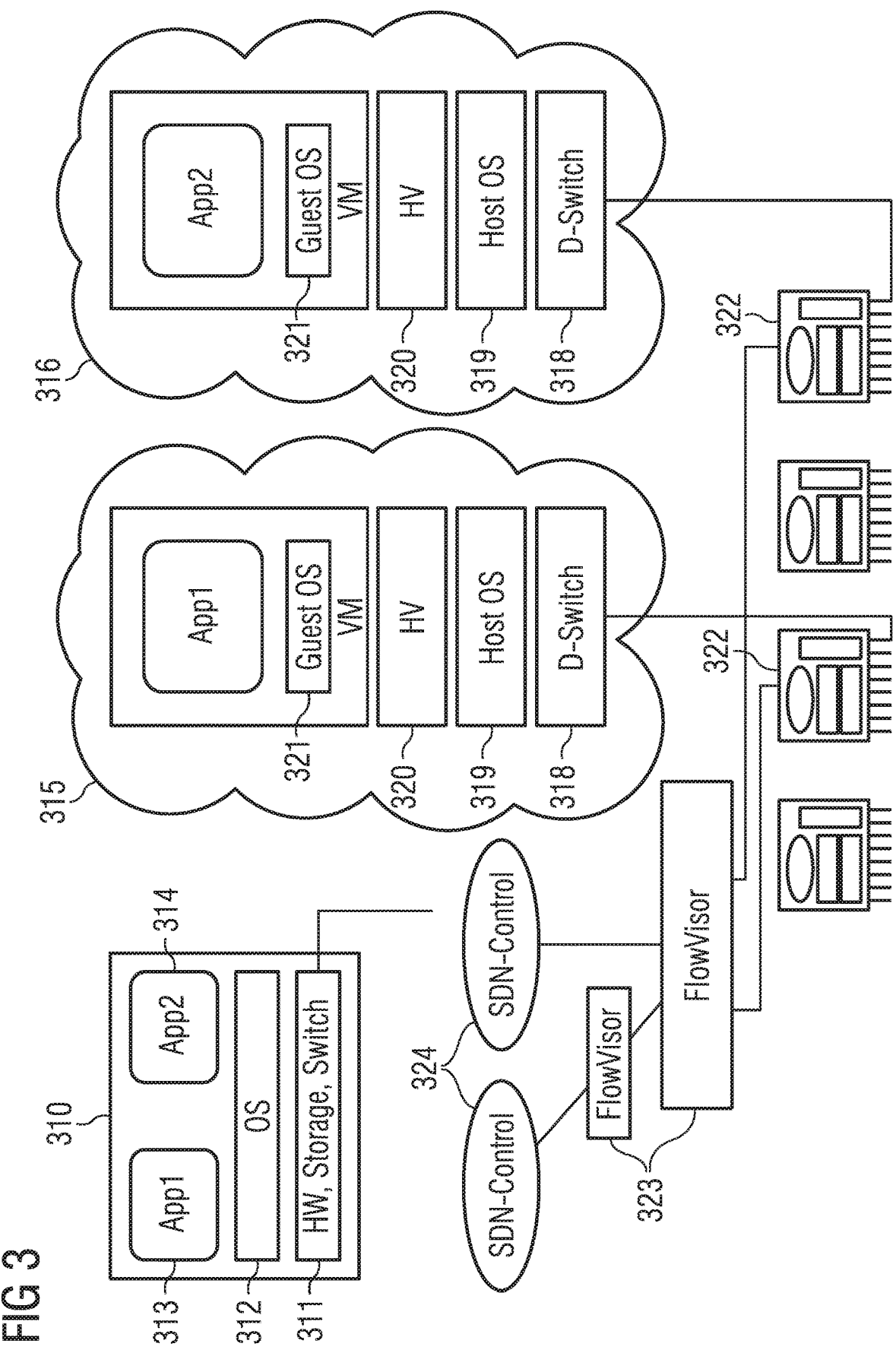

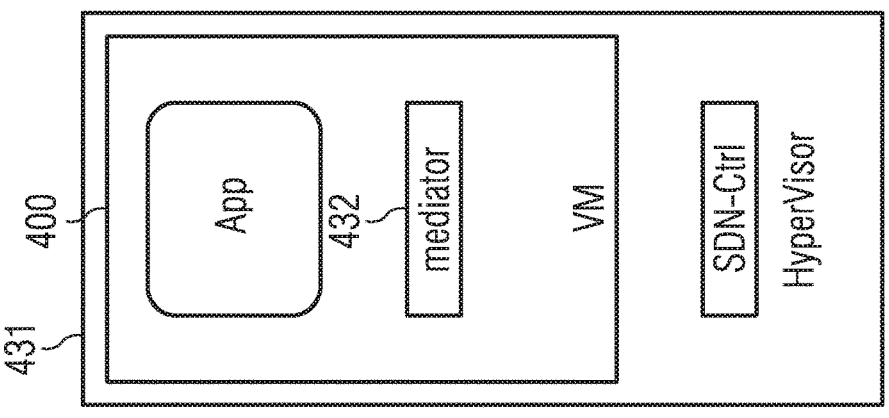
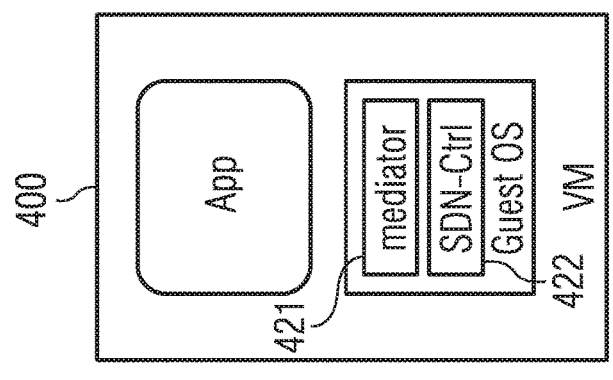
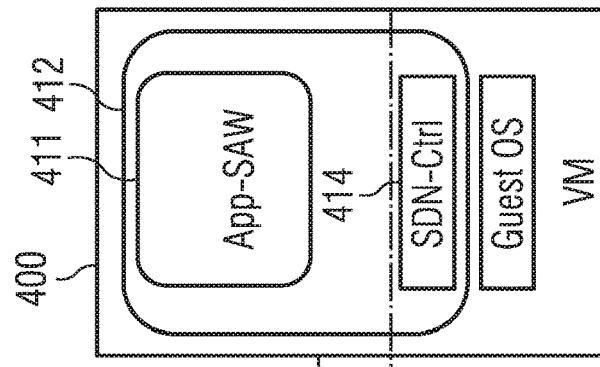
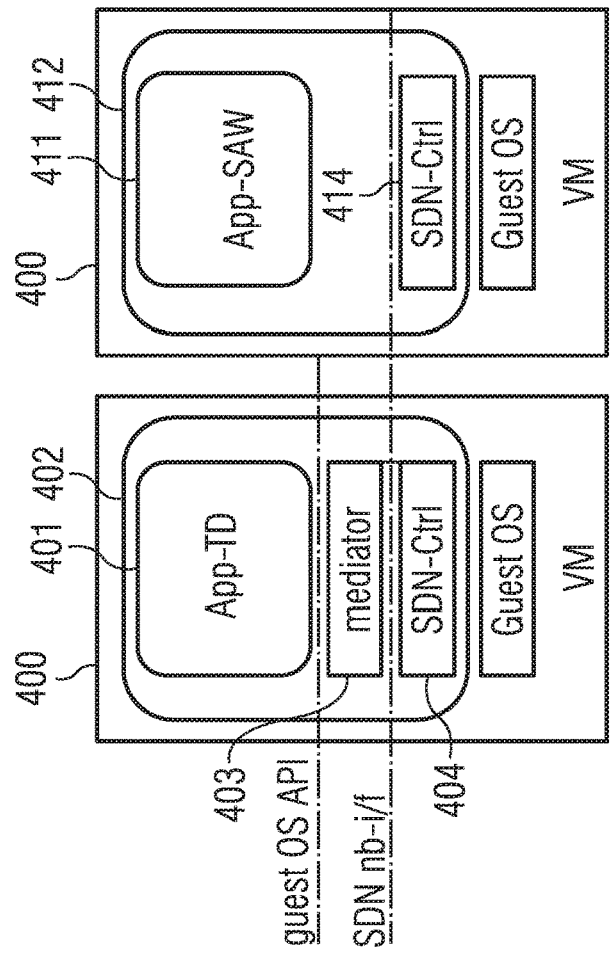

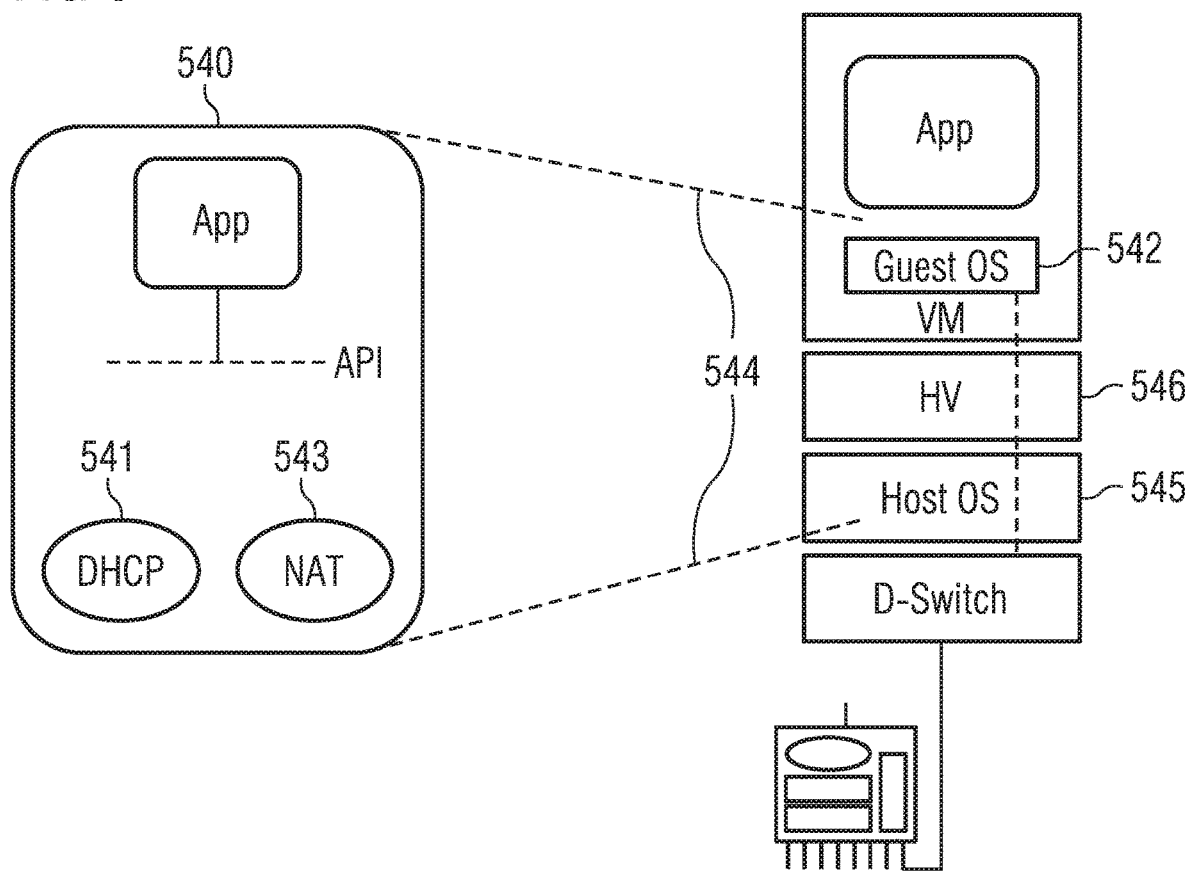

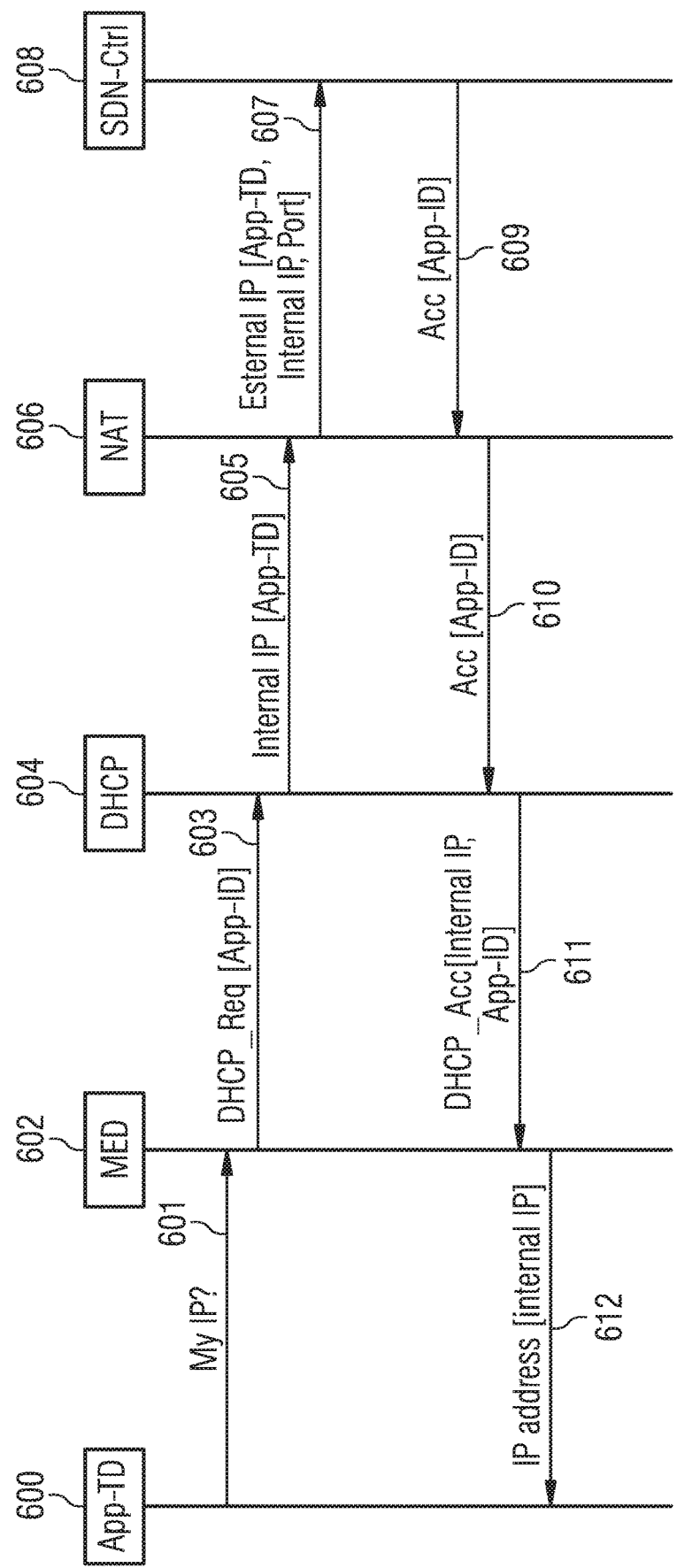

NETWORK ELEMENT AND METHOD OF RUNNING APPLICATIONS IN A CLOUD COMPUTING SYSTEM

FIELD OF INVENTION

The present invention relates to the field of cloud computing in particular to network elements for a cloud computing system or network and to methods of running applications in a cloud computing system. Furthermore, it relates to a program element and a computer-readable medium.

ART BACKGROUND

Operators are widely using IT data center technologies in their services network (e.g. VoD, CDN, News). In data centers there is an ongoing trend to "cloudify", i.e. using virtualization technologies to decouple applications from hardware deployment. Typically, applications such as video or WEB servers run on virtual machines (VMWare) which can be deployed on any suitable hardware. Thus servers and applications may be invoked and shut down on demand, the hardware (e.g. IT servers in racks, data storage) may be used almost arbitrarily—they form a "cloud". If applications are built in a suitable way the same hardware may serve almost any sort of application. This trend goes on—instead of building own "clouds" service providers may make use of third party clouds and add these capacities in storage and computing to their existing ones—or even solely rely on third party resources.

By using cloud and virtualization technologies the benefits are obvious like one (or few) hardware platforms, use on demand, very flexible assignments and huge TCO reduction.

Virtualization took part starting in the services area and now more and more mobile domains become (RAN, Core) subject of virtualization. In today's mobile networks, there are distinct nodes with distinct functionalities, like Home Subscriber System (HSS), Mobile Switching Center (Server) MSC-S, the Mobility Management Entity MME in the core and the LTE Radio base station eNodeB in the RAN, just to give some examples. Many of these distinct nodes are being decomposed such that the application (software+platform) part is decoupled from the hardware to become "ready for the cloud", i.e. they may run as applications on virtual machines in telco or IT clouds. In order to not have to re-write the whole software of e.g. an MME, existing SW and HW are re-used in such a way that SW plus operating system of a formerly monolithic node are ported onto the virtual machines. This of course puts higher requirements onto the virtual machine environment—instead of a tailored software for a given VM environment the VM must be able to cope with different operating systems running on top of them.

However, both approaches (rewriting tailored software and porting of SW+platform) are employed in the process of virtualization resulting in different cloud flavours (telco, IT) and different deficiencies that need to be addressed. FIG. 1 shows a principal cloud eco system 100.

Software that originally ran on specific nodes is now running as applications in various clouds. The starting/stopping and monitoring of applications is done by cloud orchestration functions 101. This function put copies of the application images to the Cloud Infrastructure Management System(s). The Cloud Infrastructure Management 105 and the corresponding Infrastructure-as-a-Service entities 104 have knowledge about the multitude of virtual machines in the various clouds 102 and those have the according software of the applications 103 in a pool and on demand those can distribute and invoke an application. In order to do so, the Cloud Orchestration Function will instruct the Cloud Infrastructure Management System and/or the corresponding IaaS entities to deploy the according application images on virtual machines. The cloud itself comprises of hardware (HW) that needs to be configured and monitored. Typically this is done by an Infrastructure-as-a-service IaaS function 104 that is typically shipped by the manufacturer of cloud HW together with the cloud infrastructure. Of course, if several types of clouds are utilized, several IaaS may be required that require some sort of umbrella care taking which then would be denoted as cloud infrastructure management 105.

Yet another trend is gaining momentum in CSP networks, it is software defined networking (SDN)—the decoupling of data forwarding and control. By today, typical nodes in transport networks comprise of specific functionalities. A router, for example, comprises of data switching fabriques which move data packets between the different I/O ports but it also handles all the complex routing protocols like RSVP, it holds routing tables and more. All the complex functionality and the switching is encapsulated in one box. Another example would be a carrier Ethernet switch, providing data forwarding and control on layer 2. And more and more multilayer switches are used in transport networks providing MPLS (multi protocol label switching) functionality which on top of the before mentioned router or switch functionality provide MPLS/G-MPLS signalling capability. Bottom line, depending for what purpose a transport node is used it is more or less complex providing data forwarding and control function in one monolithic node.

Both trends described above impact the evolution of mobile networks simultaneously in some way. Virtualization using data centre cloud technologies will relief the operators from asset handling for a variety of different network nodes, the expectation is that most network functions run as applications in the cloud. This demand pushes and even forces vendors to design their network functionality such that this becomes possible. Furthermore, transport networks will separate data forwarding and control such that networks can be shared.

But both technologies still have deficiencies with respect to the expected benefits. In particular, applications (e.g. WEB servers) are built from the scratch in a way that those are aware of the virtual environment they are running in thus data centre solutions do not have to cope with support for legacy "old fashioned" applications. However, vendors for network equipment cannot or will not re-write the complex functions of e.g. a HSS completely new—rather they decompose an existing node such that it falls into several applications that are ported together with their existing platform (e.g. operating system) on virtual machines—this way a complex networking function remains almost unchanged (code wise). However, it may pose requirements on the cloud environment (e.g. to ensure that applications are started in the right order, . . . ).

Though one specific flavour of SDN may be found in many data centres (for example clouds using VMWare technology implicitly use OpenFlow for communication within the data centre) this is yet not suitable for communication between applications that run in different clouds or between applications that are not even virtualized at all.

SUMMARY OF THE INVENTION

In order to achieve that both types of applications—those tailored for data center clouds and those coming from de-composed nodes—can run on the same data center environment and with both types of applications being able to access SDN based interconnect, there may be a need to provide a network element for a cloud computing system and a method of running different kinds on applications having an improved performance and/or which can be flexibly used in a cloud computing system.

This need may be met by a network element, a method of running applications in a cloud computing system, a computer-readable medium and a program element according to the independent claims. Further embodiments are described by the dependent claims.

According to an exemplary aspect, a network element for a cloud computing system is provided, wherein the cloud computing system is adapted for running applications, in particular different kinds of applications, wherein the network element comprises a receiving unit adapted to receive a resource request for running of an application, a determination unit adapted to determine whether the application is a non-SDN-aware application, and a mediator unit adapted to provide SDN context to the network element in case it is determined that the application is a non-SDN-aware application.

In particular, applications differ in way that there are those which are aware of software defined networking (SDN), also called SDN-aware applications, and those which are non-SDN-aware, also called traditional applications. In a simple form, the determination process of the determination unit may be performed by determining whether a mediator unit is present in or a mediation function is implemented on the network element. For example, the provision of SDN context may be performed via a request to components or portions of the cloud computing system, e.g. a DHCP server or a NAT server, and the corresponding response of the cloud computing system.

It should be noted that the receiving unit of the network element may receive the resource request from another network element, like a server, a data centre of the cloud or data base or may receive the request from another component or unit of the same network element, i.e. the request may be an internal request initiated for example by an application of the network element. In general the units described, e.g. the receiving unit, the determination unit, and the mediator unit may be implemented as different hardware and/or software components or may be implemented as portions or modules of a single hardware and/or software component.

According to another exemplary aspect a cloud computing system is provided which comprises at least one network element according to an exemplary aspect. In addition the cloud computing system may comprise network elements which are free of a mediation unit. Thus, the cloud computing system may comprise a mixture of network elements comprising mediation units and network elements not comprising a mediation unit.

According to an exemplary aspect a method of running applications on one cloud computing system is provided, wherein the method comprises receiving a resource request for running an application, determining whether the application is a non-SDN-aware application and in case it is determined that the application is a non-SDN-aware application employing a mediation function, wherein the mediation function provides SDN context for the application.

In particular, different kinds of applications may be run on one cloud computing system. In particular, the mediation function may be adapted to provide the network element with SDN context information needed to run the application on the network element. The context or information may be provided directly by the mediation function or may be requested by the mediation function and/or a corresponding mediator unit of the network element from another element or component of the cloud computing system, e.g. from a DHCP server or NAT server, in case an IP-address for the network element is requested or needed for running the application.

According to another exemplary aspect a program element is provided, which, when being executed by a processor, is adapted to control or to carry out a method according to an exemplary aspect.

According to another exemplary aspect a computer-readable medium is provided, in which a computer program is stored which, when being executed by a processor, is adapted to control or carry out a method according to an exemplary aspect.

The term "mediation function" may particularly denote a function which performs a mediation for a non SDN-aware application, e.g. it requests and/or provides SDN context information to the non SDN-aware application. In particular, the mediation function may mediate between an application not aware of SDN control and an SDN controller. The term "mediator unit" may particularly denote a unit performing or adapted to perform a mediation function for an application.

A gist of an exemplary aspect may be to provide a method of running a network element and a network element for a cloud computing system or network, which allows for running of different kinds of applications on different kinds of network elements or nodes. For example, some traditional applications, which are typically not aware of the specific environment of a cloud computing system may be provided with the necessary specific means from the mediator unit or mediation function. For example, it may be possible to run an application unaware of an SDN based interconnect environment on an SDN based interconnect environment, like a cloud computing system. Therefore, it may be possible to run old-style applications that have never been intended to run on a distributed or cloud computing system on such a cloud computing system without re-writing the application code.

In the following, further embodiments of the network element are described. However, the described components and features may also be used in connection with the cloud computing system, the method of running applications on cloud computing systems, the program element and the computer-readable medium.

According to an exemplary embodiment the network element further comprises an SDN controller.

In particular, the SDN controller may be embedded in an already existing environment and does not have to be implemented as an additional application. For example, the SDN controller may be embedded as an auxiliary function in a similar way as a Network Address Translation (NAT) function or a Dynamic Host Configuration Protocol Client (DHCP) function. In general the SDN controller preferably provides the same functionality as the known SDN controllers with respect to:

it shall provide a northbound interface allowing abstract demand for transport or connectivity resources;
  it shall be able to manipulate the flow tables of those network elements he has access to (e.g. in the range of what is configured in the FlowVisor(s));
  it shall appear as a "standard" controller to applications (APPs), NEs, FlowVisors and other controllers.

However, in case of the application not being SDN-aware (App-TD), the mediation function shall interwork given resource requests or given data forwarding demands (e.g. sending an IP packet) such that the APP-TD becomes suitable for an SDN controller.

According to an exemplary embodiment of the network element the SDN controller is adapted to provide a northbound interface. In particular, the northbound interface may allow for abstract demand for transport or connectivity resources.

According to an exemplary embodiment of the network element the SDN controller is adapted to manipulate flow tables of network elements. In particular, the SDN controller may be adapted to manipulate flow tables of the network elements it is connected to or has access to.

According to an exemplary embodiment of the network element the SDN controller and/or the mediator unit is implemented in a shell-like environment. In particular, the SDN controller and/or the mediator unit may form a part of a shell or may be implemented in a shell. In particular, the term "shell" may denote a software or software code that provides an interface for users of an operating system to access the services of a kernel.

According to an exemplary embodiment of the network element the SDN controller and/or the mediator unit is implemented as part of a Guest OS and/or a HyperVisor. In particular, the term "HyperVisor" or "virtual machine monitor" (VMM) may denote a piece of computer software, firmware or hardware that creates and runs virtual machines.

In general the SDN controller may be implemented into an environment which is already provided by the cloud computing system or components of the same, or may be part of an existing component of the cloud computing system. For example, the SDN controller may be implemented into an operating system and form a part or portion of the same, or may be implemented in an already existing application. That is, no additional components or application may be needed to provide an SDN controller.

According to an exemplary embodiment of the network element the network element is one element out of the group consisting of a mobile phone, a smart phone, a laptop computer, a tablet computer, a desktop computer, a server, and a database.

According to an exemplary embodiment of the network element the mediation unit is adapted to interwork resource request and/or data forwarding demands.

A data forwarding demand may be a demand for sending an IP packet, for example. In particular, the mediation function may be adapted to interwork resource requests and/or data forwarding demands in such a way that it becomes suitable for an SDN controller. That is, the mediation function may provide specific needed SDN context.

Summarizing, according to an exemplary embodiment a solution may be provided that allows applications to communicate mutually, especially when applications run in clouds/data centre environments; a transport network is virtualized following SDN principles; applications run in different clouds/data centres and/or applications are mixed, for example when:
- some applications run in clouds, some on "traditional" nodes;
- some applications are aware that they run in a virtualized environment (and thus may already be designed in a beneficial way) while others are not;
- some applications are aware that there is access to SDN based transport resources (and thus may make beneficial use of this) while others are not.

Furthermore, it should be noted that the interconnection between different network elements, sites (or data centres) based on assigned dedicated resources (e.g. a fixed 10 GBit link) may be considerable when using a method according to an exemplary embodiment. Additionally, the interworking with a virtualized transport network which is SDN controlled may be considerable as well. Moreover, the interworking between applications that are designed for clouds and those which are not may be enabled or improved—and all this may be based on a virtualized transport.

The aspects and exemplary embodiments defined above and further aspects of the invention are apparent from the example of embodiment to be described hereinafter and are explained with reference to these examples of embodiment.

BRIEF DESCRIPTION OF THE DRAWINGS

FIG. 3 schematically illustrates some issues of interworking between SDN aware applications and non SDN-aware applications.

FIG. 4 schematically illustrates some options for embedding functions according to exemplary embodiments.

FIG. 5 schematically illustrates embedding of auxiliary functions.

FIG. 6 schematically illustrates an exemplary workflow of a mediation function.

DETAILED DESCRIPTION

Figure 1:
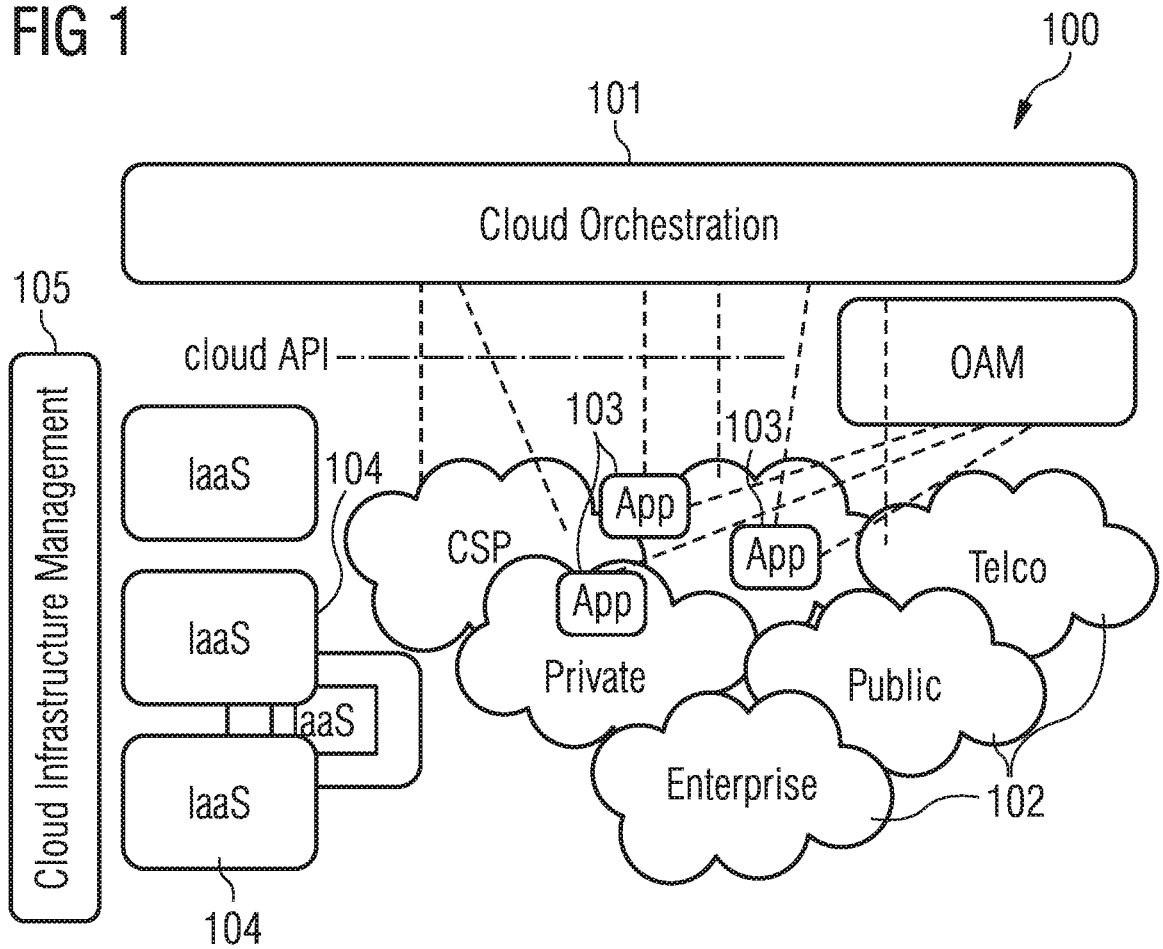
FIG. 1 schematically shows a principle cloud computing system.

The illustration in the drawing is schematic. In the following a detailed description of exemplary embodiments is given.

In particular, a detailed description with respect to a self defined networking (SDN) will be given in the beginning.

Figure 2:
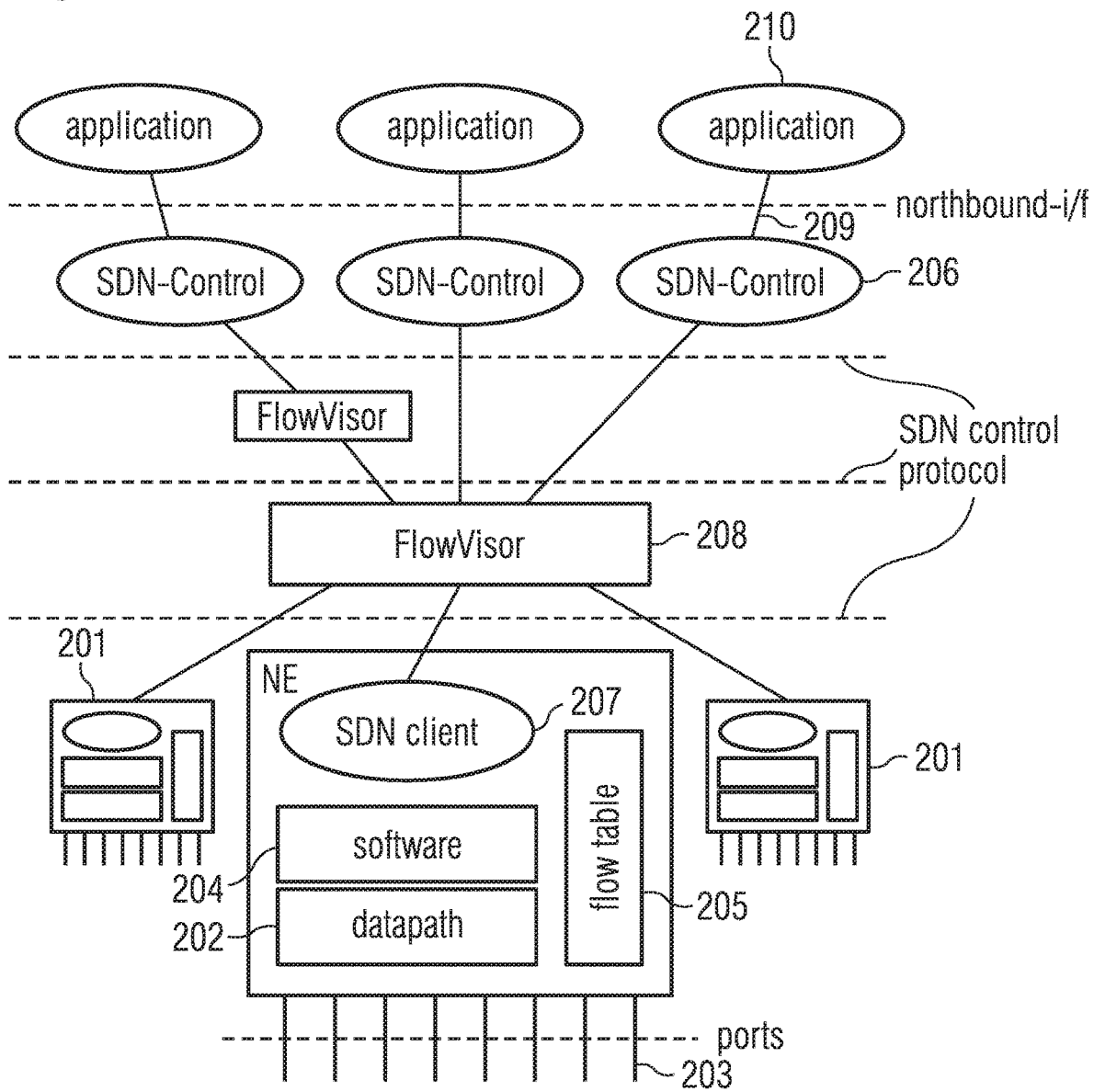
FIG. 2 describes basic principles of a software defined network (SDN).

FIG. 2 describes basic principles of an SDN. The basic idea of SDN is to decouple control functions from data forwarding functions, in other words, everything that makes a router being a router and everything that makes a switch being a switch is taken out of a node or network element (NE) and implemented into a controller. What will be remaining in the NE is pure data forwarding functionality. With this philosophy, routers, switches, MPLS nodes would all have a similar look-alike NE for data forwarding, and a specific control element (which is in general not implemented as a specific hardware but provided as a software component) which makes it a router or a switch or whatsoever.

At the bottom of FIG. 2, network elements 201 providing pure data forwarding functionality are shown. The NE comprises switching hardware (data path) 202 which provides I/O ports 203, some pieces of software 204 to allow configuration, a flow table 205 which contains port based rules for data forwarding. In the following an example how to handle a packet depending on e.g. header information may be given. For example, a rule may be that incoming packets on port 0 will be analyzed such that depending what information is in the header, the packet shall be forwarded to port 2 or 3. These rules, which are stored in the flow table 205, can be passed to the NE 201 from a controller (denoted as SDN control) 206. For that, a protocol for exchange is specified and both, the controller 206 and the NE 201 must be able to mutually understand the protocol (SDN client) schematically depicted as 207 in FIG. 2. A common representative for an SDN control protocol is OpenFlow as specified in the Open Network Foundation ONF. Another known representative is ForCES(IETF).

This way and with additional means a whole "eco system" for sharing transport equipment may be built up. NEs and controller can be cascaded and access can be limited. Introducing FlowVisors 208 may limit access to certain parts of a flow table (e.g. ports 0 to 3). Controllers themselves may act as proxies to other controllers. Finally, SDN controllers may provide a northbound i/f 209 to applications 210. By this, applications may acquire network resources via this interface in an abstracted way, e.g. "connectivity between topological point A and topological point B with a given bandwidth". SDN controllers may then instruct NEs out of a pool of NEs (there might be several options) to solve the request—still hiding the network HW to the application by using this abstract interface.

FIG. 3 schematically illustrates some issues of interworking between SDN aware applications and non SDN-aware applications. On the top left there is a non-virtualized "old style" network node 310, e.g. an HSS, which is a non SDN-aware application running on a dedicated HW, storage and switch 311, an operating system 312 and two applications 313 and 314. All together this forms one network node, e.g. an HSS. On the right side there are two cloud environments 315 and 316, e.g. two data centres, with their own data centre HW 317, their own data center internal/external switching platform D-Switch (data forwarding) 318, their own platform specific operating system Most OS 319 and with a HyperVisor HV 320 on top which interoperates with virtual machines (e.g. one per CPU core) which allows another operating system Guest OS 321 to run on a virtual machine "hiding" platform specifics to applications. In this example, the monolithic node 310 is assumed to be decomposed such that its two applications run together with the OS on virtual machines. Additionally some network elements 322 are shown which are connected to the clouds, e.g. to interconnect applications running on virtual machines of the clouds, and which are connected via FlowVisor 323 to SDN controllers 324.

In this example, both applications run in different data centres. In addition, the transport network is virtualized using SDN principles as described above. So it might well be the case that both data centres (assuming each comprises e.g. of a rack with blades interconnected via a fast Ethernet backplane) may be connected to different SDN network elements NE (to specific I/O-ports of those, respectively). While in their "traditional" setup 310 and to some extent also when both applications are running in the same cloud, communication between both applications may not be a difficult issue. However, if a virtualized transport is in between, some (to be specified) interworking with the transport control is needed, which may be performed according to an exemplary embodiment.

Before details of exemplary embodiments are described it should be noted that in known cloud computing systems specific limitations may apply:

Intra data centre connectivity can be based on OpenFlow (VMWare and Nicera). But this functionality is capsulated and not accessible/visible to the applications;

When applications run on the same node (denoted as "traditional" before) connectivity is simply given by internal bus systems—sufficient without the need to care for e.g. bandwidth limitations;

When nodes communicate in a non-virtualized environment most often a fixed connectivity is provided (e.g. leased line, NUC, SLA-based bandwidth).

In order to improve known cloud computing systems some additional functions may be added to network elements and/or methods of running applications according to exemplary embodiments. In line with the before mentioned, applications will run on virtual machines which are able to support the required Guest OS (e.g. Linux). VM run on/interwork with a HyperVisor that interworks with the given data centre platform (HW, Switch, . . . ).

FIG. 4 shows a simplified setup of the above mentioned with two types of applications running on VMs: "traditional" applications App-TD which are not aware that SDN is used in the transport and those that are "SDN-aware" (App-SAW). If those applications run on platforms that are connected to an SDN base transport network as shown in FIG. 3, all connectivity, or data packets, respectively, that will be sent outside the data centre or that will be received from outside the data centre will have to follow SDN control principles. Thus the presence of an SDN controller that is able to interwork with an SDN control architecture as shown in FIG. 2 and which is able to steer SDN based data forwarding network elements NE and that is accessible for the applications with respect to northbound interface communication is required. If applications are SDN aware (App-SAW), those most preferably communicate with this controller via the given northbound-i/f. If applications are not aware of SDN (App-TD) a mediation function is provided to interwork "traditional" communication requests towards a given SDN control (northbound) communication.

Before describing the functions of the various entities, a short discussion about the appropriate embedding of these functions is given. FIG. 4 shows four different options.

According to a first option (FIG. 4A) the new functionality of a mediator and/or of a SDN controller is placed in a shell-like environment. In this context, a shell is a software running on top of the Guest OS which provides additional functionality to the one provided by the OS. This way the application programming interface (API) to the OS is extended. Typically shells are used to "fake" a newer version of an OS by providing the functionality and the API extensions an application (that was built for this newer OS version) might require without the need to completely install the new OS.

In particular, FIG. 4A schematically shows this setup for a virtual machine 400 for running an App-TD 401 in a shell 402. For a "traditional" application this "shell" 402 encompasses a mediator 403 and an SDN controller 404. On contrast, for the case that the application is an SDN-aware application (App-SAW) 411 depicted in FIG. 4B, a corresponding shell 412 would only require SDN control functionality 414.

According to another embodiment, which is shown in FIG. 4C, the Guest OS is provided with the necessary functionality (mediator 421 and SND control 422), e.g. by extending a Linux-Kernel.

According to yet another embodiment, both functions may be an amendment of a HyperVisor 431 schematically depicted in FIG. 4D. In the latter case it may be beneficial to leave the mediation function 432 outside the HyperVisor (option 1 or 2) in order to keep the HyperVisor less complex or "clean".

It should be noted that an SDN controller or SDN controlling function may be needed for all applications according to the embodiments of FIG. 4, while mediation may only be needed for "traditional" applications or application not aware of SDN.

FIG. 5 puts, for illustration purposes, those functions (mediation function and SDN controller) into context with known "auxiliary" functions. Typically additional functions are provided by a network element 540 in order to cope with given platform environments. As an example, IP addresses are typically assigned by means of DHCP (Dynamic Host Configuration Protocol) 541. Typically, the OS (e.g. Guest OS 542) provides the function of a DHCP client which is able to acquire an IP address. Depending on the environment, however, some mediation may take place in order to "hide" the virtual nature of a given platform. Another function is Network Address Translation (NAT) 543 which allows to translate internal IP addresses into external ones. Also here, in a given environment this functionality may be mediated (e.g. the external IP address is again interworked into some other identifier).

Without further elaboration it can be stated that in today's platform setups, and especially in virtualized environments, some auxiliary functions are already in place. The dotted lines 544 in FIG. 5 indicate that those are/or can be placed as part of the Guest OS 542, Host OS 545, HyperVisor 546 or a shell depending on where it is most beneficial. The idea is to place the new functions that are required for SDN interworking in a similar way as auxiliary functions exploiting all the options that are possible for embedding as shown in FIG. 4.

FIG. 6 illustrates how the mediation function may work and uses IP address enquiry as an example.

An application (App-TD in this case) 600 may require the own (system or source) IP address for internal processing (e.g. to derive a cipher key). Thus, it typically uses the OS API command/request 601 for getting the IP address (indicated by "My IP?" in FIG. 6). The system may be in a state where it just powered up and yet there has not been any assignment of addresses and identities. The mediation function 602 issues a DHCP request 603 to a DHCP server 604 (indicated as DHCP in FIG. 6). Since, depending where this function is embedded, the mediation function may have to serve different applications, it may internally use an App-ID in order to separate different applications. The DHCP server 604 may be an auxiliary function that acts as DHCP server towards the left side (i.e. assigning an IP address out of a pool). However, since SDN transport is in place other identities rather than IP addresses might be used.

Thus the DHCP server may take an internal IP address out of a given range, report 605 this to a NAT 606 alongside with the App-ID which may translate this internal IP address to an external one with a port assignment. Finally, since SDN is in place, the SDN controller 608 shall be notified 607 thus that it can build up a context between internal IP address, external IP address and port and App-ID.

So far, no communication to another application inside or outside the cloud happened, however, the application now has a context in the SDN controller and further communication can base on this context. Now the SDN controller 608 can acknowledge the assignment and this acknowledgement can be further passed 609 to the NAT 606 and 610 the DHCP (server) 604 which finally sends 611 the internal IP address to the mediation function 602 which presents 612 this information to the application via the expected OS-API function.

Figure 7:
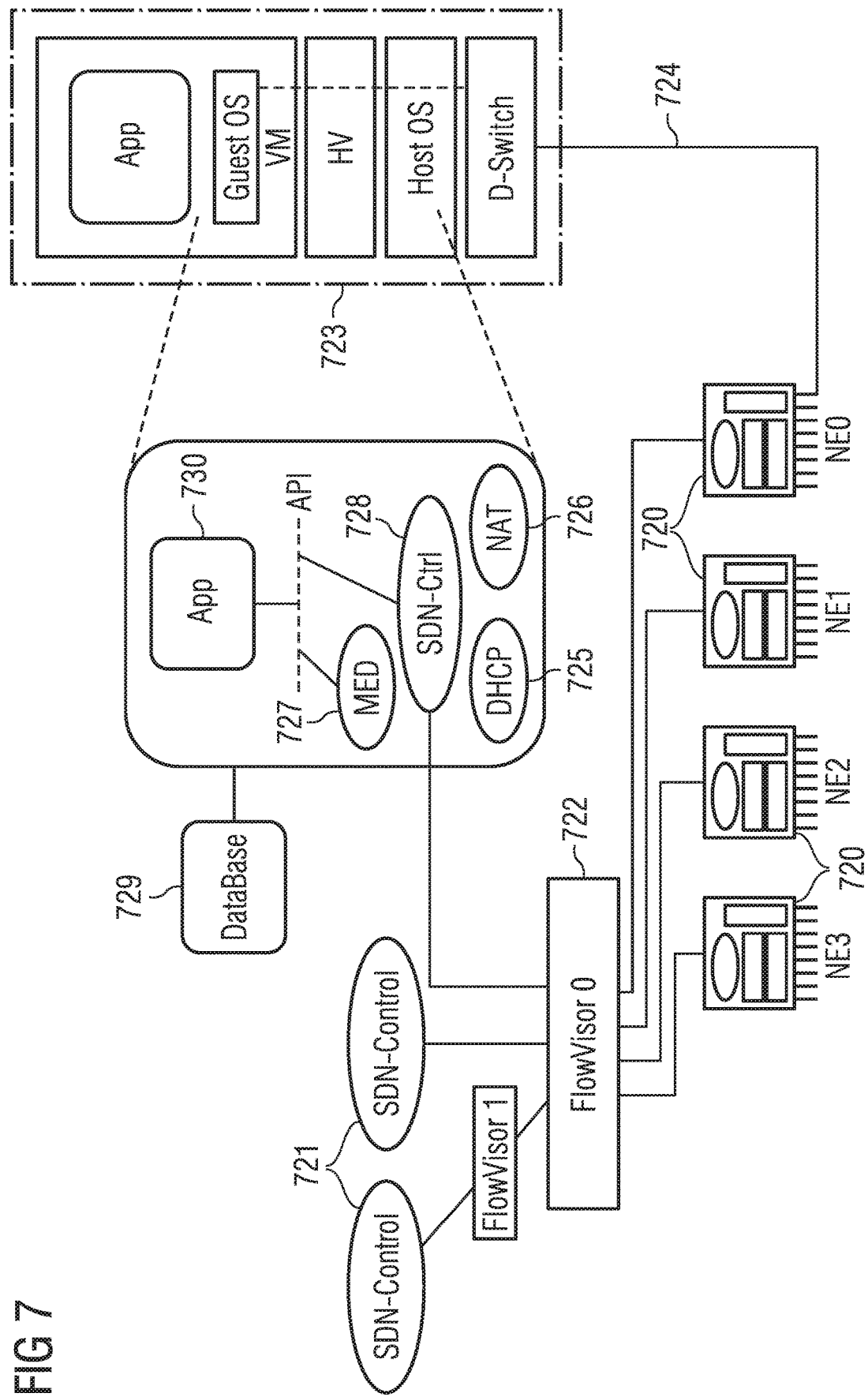
FIG. 7 shows a schematic process flow of an implementation example.

FIG. 7 shows an implementation example following the naming conventions as described before. The transport shall be based on SDN allowing different controllers to configure the multitude of network elements 720 NE0 to NE3. The embedded SDN controller 721 shall have access to all affected NE0-3 to allow manipulation of those parts of the flow tables that are accessible via FlowVisor 0 722.

The application shall run in a data centre environment 723 as sketched in the previous chapters with the data centre being physically connected 724 to one or several I/O ports of NE 0. Together with other auxiliary functions like DHCP 725 and NAT 726 a mediation function MED 727 and the SDN-controller 728 are embedded as well.

Furthermore, there is a data base 729 where all auxiliary functions that interwork with SDN transport have access to. This data base contains information on connectivity demands per application, e.g. QoS (Quality of Service) parameters. For example, an application 730 of type App-TD, which was derived as a result of decomposing a network node requires communication with another App-TD which was another application running on the same node, may have a specific QoS (e.g. bandwidth) demand for this communication. While running on a monolithic node, this may be no issue since sufficient bandwidth would be available—both applications may use the same system bus. However, if those applications run in different data centres which may hundreds of miles apart, this may become an issue and thus the QoS requirements shall be stored in this database. Depending on which network function this App-TD represents and depending on the data centre platform this information might be provided by IaaS, cloud orchestration or OAM. In case the application is of type App-SAW it is assumed, since the application is SDN aware, that the application will demand the appropriate resources via the northbound interface from the SDN controller on its own.

Figure 8:
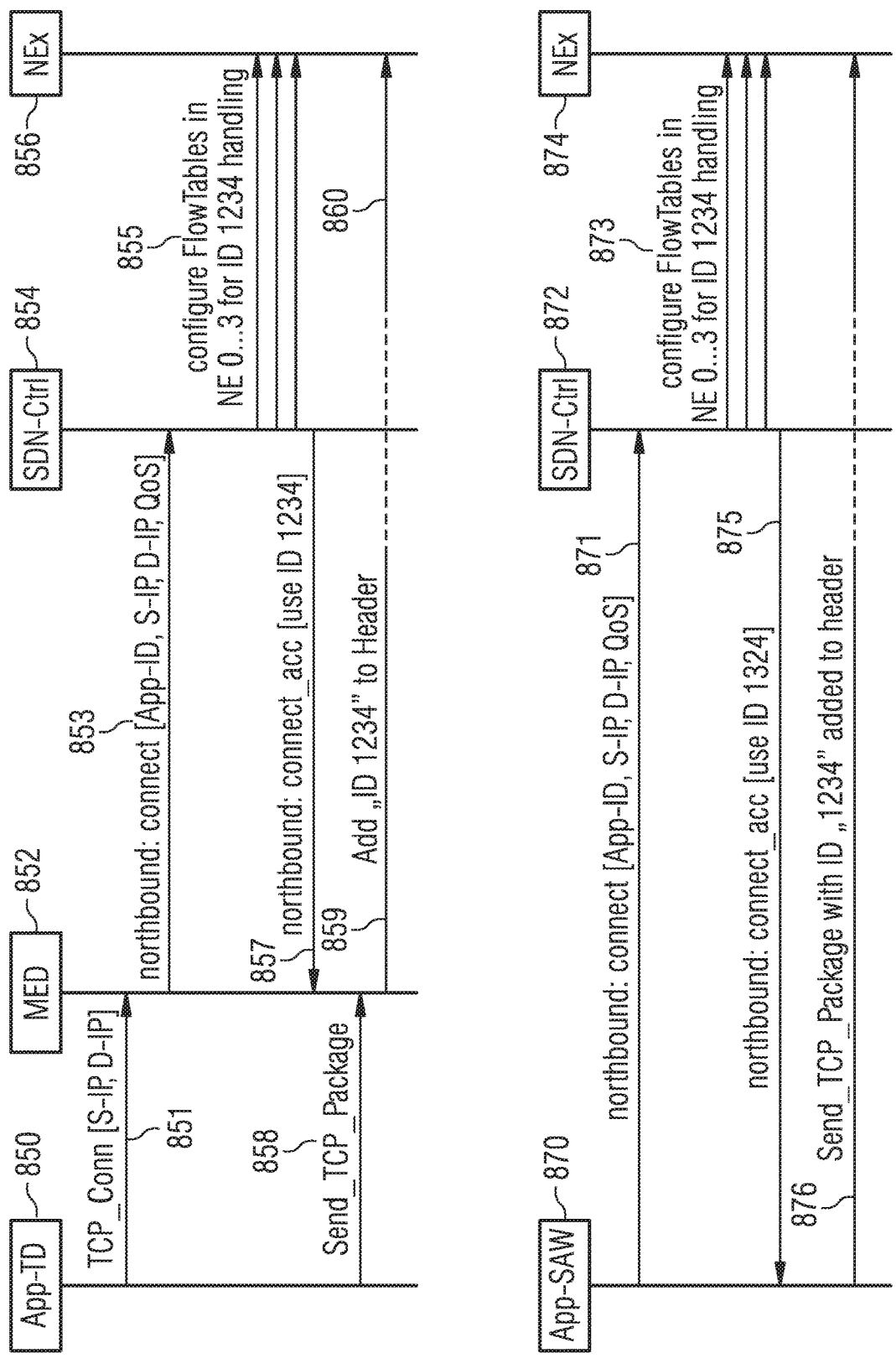
FIG. 8 illustrates a typical information exchange in a system as described in FIG. 7

FIG. 8 illustrates a typical information exchange in a system as described in FIG. 7—one for an application of type App-TD (top) and one for App-SAW (bottom).

Here an App-TD 850 wants to setup a TCP connection 851 with a far off host. Since it is not SDN aware it uses the e.g. the socket API for this setting up a connection using source and destination IP addresses (S-/D-IP).

A MED function 852 will mediate this into an abstract request for connectivity sending 853 IP addresses and QoS parameters (from data base) and e.g. an App-ID (see example of last chapter) to an SDN controller 854. The SDN controller, already having a context with this App-TD 850 will now configure 855 all NEs 856 that are required to establish connectivity between the App-TD 850 and the peer host by manipulating the according flow tables. Since NEs work on header analysis, the SDN-controller 854 might assign a specific identifier (1234 in example) that allows NEs to identify, associate and manipulate the packets. Thus it will manipulate the flow tables to listen and act on identity 1234. In return, it might report back 857 this identity to the MED function. Whenever the App-TD 850 will send 858 out a packet to this destination IP address, the MED function 852 might place or adds 859 this identify in a given header field and pass 860 the packet further on through the data centre switch towards NE 0.

The bottom part of FIG. 8 shows the same procedure for an application type App-SAW 870: in this case no mediation (and no database info) is required, the application directly "talks" to or communicates with 871 the controller 872. Which configures 873 (e.g. assign identifier) all network elements NEx 874 and at the same time reports 875 the identifier back to the App-SAW 870. Thus, the App-SAW 870 can use this assigned identifier for future data package transmission 876.

Methods according to exemplary embodiments may provide the advantage that they allow communication between applications that run in clouds and those that run on traditional nodes. Additionally, they may allow applications to configure virtualized transport resources in case SDN based transport is in place according to their specific needs and ma allow a decomposition of networks nodes such that applications of said nodes may run in different data centres.

This may allow maximum or at least increased flexibility. Operators may invoke applications in different data centres allowing them to maximize the usage of data base resources.

Those applications can automatically connect to one another always consuming only those transport resources they require leaving the rest of the transport network for sharing.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

LIST OF REFERENCE SIGNS

100 Cloud computing system
101 Cloud orchestration functions
102 Clouds
103 Applications
104 IaaS functions
105 Cloud infrastructure management
201 Network elements
202 Data path
203 I/O ports
204 Software
205 Flow table
206 SDN-Controller
207 SDN client
208 FlowVisors
209 Northbound interface
210 Applications
310 Network node
311 Hardware
312 Operating system
313, 314 Applications
315, 316 Cloud environment
317 Hardware
318 D-Switch
319 Host OS
320 HyperVisor
321 Guest OS
322 Network element
323 FlowVisor
324 SDN controller
400 Virtual machine
401 Traditional application
402 Shell
403 Mediator
404 SDN controller
411 SDN-aware application
412 Shell
414 SDN control
421 Mediator
422 SDN control
431 HyperVisor
432 Mediation function
540 Network element
541 DHCP
542 Guest OS
543 NAT
544 Indication lines
545 Host OS
546 HyperVisor
600 Traditional application
601 OS API command/request
602 Mediator
603 DHCP request
604 DHCP server
605 Reporting IP address
606 NAT
607 Notification of SDN controller
608 SDN controller
609 Acknowledge to NAT
610 Acknowledge to DHCP
611 Acknowledge to mediator
612 Reporting IP address to traditional application
720 Network elements
721 SDN controller
722 FlowVisor
723 Data centre environment
724 Connection
725 DHCP
726 NAT
727 Mediator
728 SDN controller
729 Data base
730 Application
850 Traditional application
851 TCP connection
852 Mediator
853 Sending IP address
854 SDN controller
855 Configuration of network elements
856 Network elements
857 Reporting ID
858 TCP package sending
859 Adding ID
860 Passing TCP packets
870 Application SAW
871 Communication to SDN controller
872 SDN controller
873 Configuring of network elements
874 Network elements
875 Reporting of ID
876 TCP package sending

The invention claimed is:
1. A network element for a cloud computing system the cloud computing system configured for running different kinds of applications, the network element comprising a software-defined networking (SDN) controller and a processor, the processor configured to:

receive at the processor a resource request for running of an application;

determine at the processor whether the application is a non-SDN-aware application; and receive, at the processor, from a dynamic host configuration protocol client server and a network address translator, an internal IP address, an external IP address, a port assignment, and an application identification, to build up SDN context in case the application is the non-SDN-aware application, to mediate between the non-SDN-aware application and the SDN controller, for the non-SDN-aware application to run on the network element.

2. The network element according to claim 1, wherein the SDN controller is configured to provide a northbound interface.

3. The network element according to claim 1, wherein the SDN controller is configured to manipulate flow tables of network elements.

4. The network element of claim 1, wherein the SDN controller or the processor is implemented in a shell environment.

5. The network element of claim 1, wherein the SDN controller or the processor is implemented as part of a Guest Operating System or a HyperVisor.

6. The network element of claim 1, wherein the network element comprises at least one of a mobile phone, a smart phone, a laptop computer, a tablet computer, a desktop computer, a server, or a database.

7. The network element according to claim 1, wherein the processor is further configured to interwork resource request or data forwarding demands.

8. A method for running applications, the method executed by a processor of a network element, the network element comprising a software defined networking (SDN) controller, the method comprising:

receiving at the processor a resource request for running an application;

determining at the processor whether the application is a non-software defined networking (SDN)-aware application;

receiving, at the processor, from a dynamic host configuration protocol client server and a network address translation server, an internal IP address, an external IP address, a port assignment, and an application identification, to build up SDN context for the application, in case the application is the non-SDN-aware application, to mediate between the non-SDN-aware application and the SDN controller, for the non-SDN-aware application to run on the network element.

9. A non-transitory computer-readable medium, in which a computer program is stored which, when being executed by the processor, is configured to carry out the method according to claim 8.

* * * * *